United States Patent [19]

Okumori et al.

[11] Patent Number: 5,053,156

[45] Date of Patent: Oct. 1, 1991

[54] PROCESS FOR PRODUCING FERRITE POWDER FOR FERRITE MAGNETS

[75] Inventors: Kunio Okumori, Kyoto; Kazuo Terada, Amagasaki, both of Japan

[73] Assignee: Sumitomo Special Metals Co. Ltd., Osaka, Japan

[21] Appl. No.: 618,937

[22] Filed: Nov. 28, 1990

[51] Int. Cl.$^5$ .................. C04B 35/26; C04B 35/64
[52] U.S. Cl. .................. 252/62.58; 252/62.59; 252/62.63
[58] Field of Search ............. 252/62.63, 62.58, 62.59

[56] References Cited

U.S. PATENT DOCUMENTS 3,887,478  6/1975  Eadie ........................... 252/62.63

FOREIGN PATENT DOCUMENTS

| 0157215 | 12/1980 | Japan | 252/62.63 |
| 58-190005 | 11/1983 | Japan . | |
| 0194305 | 11/1983 | Japan | 252/62.63 |
| 58-202504 | 11/1983 | Japan . | |

*Primary Examiner*—Prince Willis, Jr.
*Assistant Examiner*—R. D. Flatter
*Attorney, Agent, or Firm*—Watson, Cole, Grindle & Watson

[57] ABSTRACT

A process for producing ferrite powder for high performance ferrite magnets is claimed, which comprises: milling magnetite or mill scale into a powder comprising particles of specified particle size; oxidizing the milled product to obtain a powder containing 98.0% or higher $Fe_2O_3$; further adding thereto iron oxide originated from iron chloride or iron sulfide together with an oxide or a carbonate of Sr or Ba; and calcining the resulting powder mixture.

The present invention provides a low-cost process for producing ferrite powder for ferrite magnets having high pellet strength as well as high magnetic properties, from which a high performance Sr-ferrite magnet as well as Ba-ferrite magnet suitable for use in automobile motors can be readily produced by simply molding the powder under a magnetic field and sintering.

11 Claims, No Drawings

PROCESS FOR PRODUCING FERRITE POWDER FOR FERRITE MAGNETS

FIELD OF THE INVENTION

The present invention relates to a process for producing a ferrite powder suitable as a starting material from which ferrite magnets are produced, using coarse particles of iron oxide obtained from magnetite or mill scale. That is, the present invention relates to a process for producing a ferrite powder for ferrite magnets from iron oxides, which saves the cost of milling by using an inclined-type rotary kiln. More specifically, it relates to a process for providing a ferrite powder for ferrite magnets at low cost and yet having excellent magnetic properties, which comprises finely pulverizing iron oxide to a powder comprising particles of required particle size; oxidizing the pulverized product to obtain a powder containing 98.0% or higher $Fe_2O_3$; further adding thereto iron oxide originated from iron chloride or iron sulfide together with an oxide or a carbonate of Sr or Ba, to thereby avoid coalescence of the starting powder due to partial melting caused by producting of pellets on calcining.

BACKGROUND OF THE INVENTION

A magnet of a ferrite ($MO.nFe_2O_3$, wherein M represents Sr or Ba, and n is from 5.0 to 6.2) is generally produced by a process which comprises mixing iron oxide obtained from magnetite or mill scale with an oxide or a carbonate of Sr or Ba, calcining the mixture, pulverizing the calcined material, molding the pulverized material into a particular shape, and sintering the molded product.

The calcining step in further detail is carried out by allowing to react iron oxide with an oxide or a carbonate of Sr or Ba in an inclined rotary kiln to obtain a Sr-ferrite or a Ba-ferrite. In general, magnetite, mill scale, or iron oxide derived from iron chloride or iron sulfide typically has a composition as shown in Table 1.

a time-consuming milling process, and, more disadvantageously, that this prevents iron oxide from undergoing complete ferritizing reaction with an oxide or a carbonate of Sr or Ba in the subsequent calcining step.

It was based on those finding that the present inventors have proposed a process described in foregoing Japanese Patent Application Hei-1-81789, which comprises milling a magnetite or a mill scale to a specified particle size or less; completely oxidizing the milled material so as to obtain a product containing $Fe_2O_3$ for a specified amount or more; adding to the resulting oxidized product a predetermined oxide or carbonate of Sr or Ba; calcining the mixture., and finally obtaining ferrite magnet through a prescribed process steps.

The iron oxide thus produced in te aforementioned process had, however, yet to be increased in strength as a pellet, since it caused troubles in operation. That is, the pellet was liable to powder at calcining in the inclined rotary kiln and therefore underwent partial melting, which as a consequence adhered on the inner wall of the kiln; or it tended to coalesce into a bulk of about 100 mm in diameter that made the subsequent milling rather difficult.

SUMMARY OF THE INVENTION

It is, therefore, an object of the present invention to provide a process for producing at low cost, a ferrite powder for use as a starting material for manufacturing ferrite magnets having excellent magnetic properties, freed from the aforementioned problems of coalescence into bulks due to partial melting and powdering of pellets at the calcining step.

That is, the present invention in detail comprises steps as follows: subjecting the magnetite or mill scale to ore-dressing or flotation, then to milling to obtain fine powder comprising particles 12 $\mu$m or less in average particle diameter; oxidizing the milled product at from 600° to 900° C. in an atmosphere containing oxygen to thereby control the $Fe_2O_3$ content to 98.0% or more; mixing from 10 parts to 93 parts by weight of the resulting oxidized powder with from 7 parts to 90 parts by

TABLE 1

| wt. % | T.Fe | FeO | $Fe_2O_3$ | $Fe_3O_4$ | $SiO_2$ | $Al_2O_3$ | MgO | CaO |
|---|---|---|---|---|---|---|---|---|
| magnetite | 69.1 | — | 1.5 | 93.7 | 1.5 | 0.30 | 0.60 | 0.61 |
| mill scale | 74.88 | 67.5 | 32.6 | — | 0.09 | 0.06 | 0.003 | 0.10 |
| Fe-oxide (chloride) | 68.9 | — | 98.5 | — | 0.05 | 0.05 | — | 0.02 |
| Fe-oxide (sulfide) | 68.9 | — | 98.5 | — | 0.30 | 0.10 | — | 0.04 |

The Table reads that both magnetite and mill scale contain, however, a large amount of FeO and $Fe_3O_4$ in addition to $Fe_2O_3$, and therefore there is required an additional step for completely converting magnetite or mill scale into $Fe_2O_3$ by oxidizing those iron oxide sources in an oxygen-containing atmosphere or in air, prior to the adding and mixing of the oxide or carbonate of Ba or Sr. The oxidized magnetite or mill scale requires, however, ascribed to large particle size thereof, a long period of time for milling in the subsequent process, and this was undesirable from the viewpoint of economy and productivity.

The present inventors accordingly examined the cross-sectional structure of the oxidized magnetite and mill scale to find that it consists of a surface layer of $Fe_2O_3$ 6 $\mu$m or less in thickness, and a core composed of a mixed $FeO.Fe_3O_4$ phase. We have concluded that it is due to this structure that the oxidized material requires weight of of an iron oxide derived from iron chloride or iron sulfide, and further adding thereto an oxide or a carbonate of Sr or Ba; and calcining the resulting mixture in an inclined rotary kiln.

The process according to the present invention enables production of a starting material for a high performance Sr-ferrite magnet, which, by pulverizing the starting material to a powder comprising particles having a predetermined particle size, molding the powder applying a magnetic field, and sintering the molded products, yields a Sr-ferrite magnet having a residual flux density, Br, of from 4.0 to 4.2 kG; a coercive force, Hc, of from 3.7 to 3.9 kOe., a maximum energy product, $(BH)_{max}$, of from 3.8 to 4.2 MGOe; and an intrinsic coercive force, iHc, of from 4.0 to 4.2 kOe.

The magnetite or mill scale for use in the present invention should be milled in particle size to 12 $\mu$m or less prior to oxidation treatment. If the powder comprises particles having a diameter of over the specified 12 μm, the resulting particles after oxidation are such containing residual $FeO \cdot Fe_3O_4$ inside each particle that they not only require longer time for milled, but also they may lead to incomplete ferritization at the calcining step.

The oxidation treatment is carried out at 600° C. or higher but not exceeding 900° C. It is not possible to fully oxidize $Fe_3O_4$ and FeO inherent in the magnetite or mill scale into $Fe_2O_3$ at a temperature lower than 600° C. At a temperature exceeding 900° C., on the other hand, there arises a fear that the magnetite or mill scale may undergo partial melting; in addition, the particles grow into larger ones that they bring about undesirable effects in the subsequent milling process. That is, not only is the milling efficiency adversely reduced, but also the process becomes an energy consuming one.

The oxidation treatment preferably is completed in a duraton of from 0.1 hours to 1.5 hours. Not a complete oxidation reaction is expected in a treatment finished in less than 0.1 hours, but too long a treatment as exceeding 1.5 hours also is not favorable, since sintering takes place and results in grain growth.

It is essential in the process of the present invention to obtain iron oxides containing 98.0% or more of $Fe_2O_3$ after the oxidation treatment, and in doing so, the particle size of the milled particles, as well as the temperature and duration of the oxidation treatment, plays an important role.

Accordingly, the present invention comprises as a characteristic feature, adding from 7 parts to 90 parts by weight of iron oxide particles 2 μm or less in diameter derived either from iron sulfide or iron chloride to a predetermined amount of oxidized iron oxide powder.

In further detail, the point of the present invention resides in that a specified amount of an iron oxide derived from either iron sulfide or iron chloride is used to increase the strength of the pellets, since pellets comprising singly the oxidation-treated iron oxide lack sufficient strength that they break apart and are powdered in the rotary kiln, and undergo partial melting, which as a consequence adhered on the inner wall of the kiln or it tended to coalesce into a bulk of about 100 mm in diameter that made the subsequence milling rather difficult.

When the amount of the oxidation-treated iron oxide exceeds 93 parts by weight, and that of the iron oxide derived from either iron chloride or iron sulfide is reduced to less that 7 parts by weight, there cannot be expected a sufficient improvement in the pellet strength. Decreasing the amount of the former to less than 10 parts by weight whereby increasing that of the latter to more than 90 parts by weight, on the other hand, there is not expected further improvement in the strength of the pellet since this effect becomes saturated at this value. More disadvantageously, increasing the amount of the latter iron oxide increases expenses and is therefore undesirable.

Preferably, the iron oxide subjected to oxidation treatment and that derived from either iron chloride or iron sulfide are mixed at the former to the latter ratio in parts by weight, of from 70:30 to 90:10.

The calcination treatment in the inclined rotary kiln preferably is carried out in an oxidizing atmosphere at from 1250° C. to 1350° C., for a duration of from 15 minutes to 1 hour.

The inclined rotary kiln to be used in the present invention preferably has a length of from 15 to 30 meters with an inner diameter of from 1.0 to 2.0 meters, having a gradient, i.e., the ratio of the inclined height to the length of the rotary kiln, of from 15/1000 to 40/1000. The kiln preferably is operated at a rotational speed of from 0.5 to 3 rpm.

The ferrite magnet according to the present invention may further comprise as additives to improve sinterability or to achieve higher magnetic performance, 2% or less of at least one selected from a group consisting of $SiO_2$, $Cr_2O_3$, CaO, $Al_2O_3$, CoO, and NiO.

If the maqnetite or mill scale contains impurities such as $TiO_2$, MgO, $SiO_2$, or the like, there should be incorporated an additional purification step such as magnetic separation and flotation.

Now the invention is explained in further detail by way of non-limited examples below.

EXAMPLE 1

Magnetite iron ore (granular, from Sweden) the composition of which is shown in Table 2 below was milled to particles 10 μm in average diameter, and oxidized in a rotary furnace at 800° C. in air to obtain an oxidized iron oxide containing 99.5% of $Fe_2O_3$. To 70 parts by weight of this oxidation-treated iron oxide powder comprising particles 10 μm in average diameter were added 30 parts by weight of iron oxide powder (the composition of which is given in Table 1; derived from iron chloride) comprising particles 1 μm in average diameter and $SrCO_3$ at an amount to give a base composition for a ferrite magnet having an $Fe_2O_3/SrO$ ratio by molar of 6 0.

The mixture was pelletized into pellets 10 mm in average diameter, which were then rotated 100 turns in a commercially available rattler testing machine to test for the pellet strength. The evaluation is based on percentage weight loss. The results are given in Table 4.

The pellets were further calcined at 1300° C. for 1 hour in an inclined rotary kiln 24 meter in length, 1.6 meter in inner diameter, and 20/1000 in gradient (inclined height/length of the kiln), operating at a rotational speed of 1 rpm. No unfavorable coalescence of the pellets was encountered during the operation.

The calcined pellets were then crushed into coarse particles, and were added thereto as additives, 0.4% of $SiO_2$, 0.5% of $Cr_2O_3$, 0.3% of CoO, and 0.4% of CaO. The mixture was further pulverized to give fine powder comprising particles 0.85 μm in average diameter, which was molded applying a magnetic field of 8 kOe under a molding pressure of 0.5 ton/$cm^2$, followed by sintering at 1250° C. for an hour to obtain a Sr-ferrite magnet The magnetic properties of the Sr-ferrite magnet are given in Table 4.

TABLE 2

| | | | (by wt. %) | | | | | |
|---|---|---|---|---|---|---|---|---|
| T.Fe | FeO | $Fe_2O_3$ | $Fe_3O_4$ | $SiO_2$ | $Al_2O_3$ | CaO | MgO | $TiO_2$ |
| 70.46 | — | 1.6 | 93.6 | 1.00 | 0.16 | 0.44 | 0.35 | 0.38 |

EXAMPLE 2

Mill scale the composition of which is given in Table 3 was mechanically milled to particles having an average diameter of 8 μm, and was oxidized at 800° C. in air for an hour in a rotary furnace to give an iron oxide containing 99.2% of $Fe_2O_3$. To 90 parts by weight of this oxidation-treated iron oxide powder comprising particles 8 μm in average diameter were added 10 parts by weight of iron oxide powder (derived from iron chloride) comprising particles 1 μm in average diameter and $SrCO_3$ in the same amount as in Example 1. The mixture was pelletized into pellets 10 mm in average diameter in the same manner as in Example 1, and subjected to the same test set forth above to test for the pellet strength. The results are given in Table 4.

The pellets were further calcined at 1300° C. for 1 hour in an inclined rotary kiln 24 meter in length, 1.6 meter in inner diameter, and 20/1000 in gradient (inclined height/length of the kiln), operating at a rotational speed of 1.2 rpm. The calcined pellets were then milled to obtain particles 4 μm in average diameter, to which were added as additives, 0.4% of $SiO_2$, 0.5% of $Cr_2O_3$, 0.3% of CoO, and 0.4% of CaO. The mixture was further pulverized to give fine powder comprising particles 0.75 μm in average diameter, which was molded applying a magnetic field of 7.5 kOe under a molding pressure of 0.48 ton/cm², followed by sintering at 1250° C. for an hour to obtain a Sr-ferrite magnet. The magnetic properties of the Sr-ferrite magnet are given in Table 4.

TABLE 3

| | | | (by wt. %) | | | | |
|---|---|---|---|---|---|---|---|
| T.Fe | FeO | $Fe_2O_3$ | $Fe_3O_4$ | $SiO_2$ | $Al_2O_3$ | CaO | MgO |
| 75.3 | 72.44 | 27.18 | — | 0.11 | 0.06 | 0.12 | 0.005 |

COMPARATIVE EXAMPLE 1

The same mill scale used in Example 2 was mechanically milled to particles 15 μm in average diameter. The resulting powder was subjected to the same oxidation treatment as in Example 2 to give an iron oxide powder containing 99.5% of $Fe_2O_3$, from which a magnet of Sr-ferrite was produced in the same manner as in Example 2, except for mixing no iron oxide derived from iron chloride. Test for pellet strength was also performed in accordance with that described in Example 1. The results are given in Table 4.

The magnetic properties of the Sr-ferrite magnet thus produced are also given in Table 4.

COMPARATIVE EXAMPLE 2

The same mill scale used in Example 2 was mechanically milled to particles 8 μm in average diameter. The resulting powder was subjected to the same process for producing a Sr-ferrite magnet as in Example 2 except for not subjecting the milled powder to oxidation treatment. Thus, a magnet of Sr-ferrite was produced in the same manner as in Example 2, following the same process of mixing, pelletizing, calcining, milling, pulverizing, molding under a magnetic field, and sintering. In this case, however, iron oxide had a low $Fe_2O_3$ content of 30%. The results obtained in the test for pellet strength together with the magnetic properties of the Sr-ferrite magnet are given in Table 4.

EXAMPLE 3

Mill scale the composition of which is given in Table 3 was mechanically milled to particles having an average diameter of 10 μm, and was oxidized at 800° C. in air for an hour in a rotary furnace to give an iron oxide containing 99.0% of $Fe_2O_3$. To 80 parts by weight of this oxidation-treated iron oxide powder comprising particles 10 μm in average diameter were added 20 parts by weight of iron oxide powder (derived from iron chloride) comprising particles 1 μm in average diameter and $BaCO_3$ at an amount to give a base composition for a ferrite magnet having an $Fe_2O_3$/BaO ratio by molar of 6.0. The mixture was pelletized into pellets 10 mm in average diameter, which were subjected to the same test for the pellet strength as in Example 1. The results are given in Table 4.

The pellets were further calcined in air at 1320° C. for 1 hour in an inclined rotary kiln 24 meter in length, 1.0 meter in inner diameter, and 20/1000 in gradient (inclined height/length of the kiln), operating at a rotational speed of 1 rpm. The calcined pellets were then milled to obtain particles 5 um in average diameter, to which were added 0.55% of $SiO_2$ and 0.65% of CaO as additives. The mixture was further pulverized to give fine powder comprising particles 0.9 μm in average diameter, which was molded applying a magnetic field of 7 kOe under a molding pressure of 0.5 ton/cm², followed by sintering at 1250° C. for an hour to obtain a Ba-ferrite magnet. The magnetic properties of the Ba-ferrite magnet are given in Table 4.

COMPARATIVE EXAMPLE 3

The same mill scale used in Example 3 was mechanically milled to particles 10 μm in average diameter. The resulting powder was subjected to the same process for producing a Ba-ferrite magnet as in Example 3 except for not subjecting the milled powder to oxidation treatment. Thus, a magnet of Ba-ferrite was produced in the same manner as in Example 3, following the same process of mixing, pelletizing, calcining, milling, pulverizing, molding under a magnetic field, and sintering. In this case, however, iron oxide had a low $Fe_2O_3$ content of 33%. The results obtained in the test for pellet strength together with the magnetic properties of the Ba-ferrite magnet are given in Table 4.

TABLE 4

| | Br(kG) | Hc(kOe) | $(BH)_{max}$(MGOe) | iHc(kOe) | Pellet Strength* |
|---|---|---|---|---|---|
| Example 1 | 4.12 | 3.83 | 4.07 | 4.03 | 11% |
| Example 2 | 4.14 | 3.79 | 4.02 | 4.14 | 16% |
| Example 3 | 4.12 | 2.00 | 3.96 | 2.05 | 14% |
| Comp. Ex. 1 | 4.04 | 3.70 | 3.96 | 4.11 | 25% |
| Comp. Ex. 2 | 4.08 | 3.25 | 3.99 | 3.60 | 23% |
| Comp. Ex. 3 | 3.97 | 1.52 | 3.16 | 1.68 | 27% |

*Pellet strength is given by percentage weight loss.

From the results above, it can be seen that the present invention provides a low-cost process for producing starting materials for ferrite magnets having high pellet strength, which comprises milling-magnetite or mill scale into a powder comprising particles of specified particle size; oxidizing the milled product to obtain a powder containing 98.0% or higher $Fe_2O_3$; further adding thereto iron oxide originated from iron chloride or iron sulfide together with an oxide or a carbonate of Sr or Ba; and calcining the resulting powder mixture.

From the ferrite powder thus produced above, a high performance Sr-ferrite magnet suitable for use in automobile motors can be readily produced by simply molding the powder under a magnetic field and sintering. Examples 1 and 2 shown in Table 1 are typical ones for such, having a Br falling in the range of from 4.0 to 4.2 kG, an Hc in the range of from 3.7 to 3.9 kOe, a (BH)max in the range of from 3.8 to 4.2 MGOe, and an iHc in the range of from 4.0 to 4.2 kOe. It is also possible to obtain as well, a high performance Ba-ferrite magnet having magnetic properties such as a Br of from 4.0 to 4.3 kG, an Hc of from 1.9 to 2.3 kOe, a (BH)max of from 3.5 to 4.0 MGOe, and an iHc of from 2.0 to 2.4 kOe.

What is claimed is:

1. A process for producing a ferrite powder for use in the manufacture of a ferrite magnet, which comprises: milling magnetite or mill scale to a powder comprising particles 12 μm or less in average diameter; subjecting the powder to oxidation treatment at from 600° C. to 900° C. in an atmosphere containing $O_2$ or in air to thereby obtain a powder containing 98.0% or more by weight of $Fe_2O_3$; mixing from 10 parts to 93 parts by weight of the oxidation-treated iron oxide powder with from 7 parts to 90 parts by weight of an iron oxide derived from either iron chloride or iron sulfide, and adding further thereto an oxide or a carbonate of Sr or Ba; and calcining the resulting mixture in an inclined rotary kiln to obtain the ferrite powder.

2. The process as claimed in claim 1, wherein the ferrite powder has a base composition for a ferrite magnet having an $Fe_2O_3$/MO (where, M represents Sr or Ba) ratio by molar of from 5.0 to 6.2.

3. The process as claimed in claim 2, wherein the ferrite powder comprises in addition to the base composition, 2% by weight or less of at least one selected from the group consisting of $SiO_2$, CaO, $Al_2O_3$, $Cr_2O_3$, CoO, and NiO.

4. The process as claimed in claim 1, wherein the oxidation treatment is carried out for a duration of from 0.1 to 1.5 hours.

5. The process as claimed in claim 1, wherein the iron oxide powder mixture comprises the oxidation-treated powder and the oxide powder derived from either an iron chloride or iron sulfide, at the former to the latter ratio in parts by weight of from 70:30 to 90:10.

6. The process as claimed in claim 1, wherein the calcination in the inclined rotary kiln is effected in the temperature range of from 1250° C. to 1350° C. for 15 minutes to 1 hour in an oxidizing atmosphere.

7. The process as claimed in claim 1, wherein the inclined rotary kiln has a length from 15 to 30 meters and an inner diameter of from 1.0 to 2.0 meters.

8. The process as claimed in claim 7, wherein the inclined rotary kiln has a gradient as defined by the ratio of the inclined height to the length of the kiln, of from 15/1000 to 40/1000.

9. The process as claimed in claim 7, wherein the inclined rotary kiln is operated at a rotational speed of from 0.5 rpm to 3 rpm.

10. The process as claimed in claim 1, wherein the ferrite powder produces a Sr-ferrite magnet having magnetic properties comprising a Br in the range of from 4.0 to 4.2 kG, an Hc of from 3.7 to 3.9 kOe, a (BH)max of from 3.8 to 4.2 MGOe, and an iHc of from 4.0 to 4.2 kOe.

11. The process as claimed in claim 1, wherein the ferrite powder produces a Ba-ferrite magnet having magnetic properties comprising a Br in the range of from 4.0 to 4.3 kG, an Hc of from 1.9 to 2.3 kOe, a (BH)max of from 3.5 to 4.0 MGOe and an iHc of from 2.0 to 2.4 kOe.

* * * * *

UNITED STATES PATENT AND TRADEMARK OFFICE
CERTIFICATE OF CORRECTION

PATENT NO.   :  5,053,156
DATED        :  October 1, 1991
INVENTOR(S)  :  Kunio OKUMORI, Kazuo TERADA It is certified that error appears in the above-identified patent and that said Letters Patent is hereby corrected as shown below:

On the title page:

Insert the following in the heading of the patent:

[30]  Foreign Application Priority Data

Feb. 21, 1990    Japan    2-40347

Signed and Sealed this

Second Day of February, 1993

Attest:

STEPHEN G. KUNIN

*Attesting Officer*    *Acting Commissioner of Patents and Trademarks*